United States Patent Office 2,913,398
Patented Nov. 17, 1959

2,913,398

REFORMING OF A NAPHTHA WITH A CATALYST COMPOSITE CONSISTING OF A GROUP VI METAL COMPOUND SUPPORTED ON ETA-ALUMINA

Earl W. Riblett, Tenafly, and William P. Burton, Little Silver, N.J., Herman S. Kaufman, Brooklyn, N.Y., and Philip A. Lefrancois, Cranford, N.J., assignors to The M. W. Kellogg Company, Jersey City, N.J., a corporation of Delaware No Drawing. Application April 23, 1952
Serial No. 283,995

12 Claims. (Cl. 208—136)

This invention relates to improved catalytic reactions, and more particularly pertains to improved processes wherein a catalyst containing eta-alumina is employed. This application is related to application Serial No. 283,994, filed concurrently herewith.

An object of this invention is to provide improved catalytic reactions utilizing a catalyst containing eta-alumina.

Another object of the present invention is to provide an improved method for catalyzing hydrocarbon conversion with a catalyst containing eta-lumina.

Still another object of this invention is to provide an improved catalytic process for altering the carbon-hydrogen ratio of a hydrocarbon.

A further object of this invention is to provide an improved process for reforming naphthas.

A still further object of the present invention is to provide an improved method for hydroforming petroleum naphthas.

Other objects and advantages of this invention will become apparent from the following description and explanation thereof.

The present invention comprises a novel catalytic process in which is utilized a catalyst comprising a metal of group VI of the periodic table and/or a sulfide and/or an oxide thereof supported on eta-alumina.

The process of the present invention possesses numerous outstanding advantages and has a wide field of utility. In general, the process is suitable for any reactions which are susceptible to catalysis with a metal of group VI of the periodic table and/or a sulfide and/or an oxide thereof in combination with eta-alumina, with or without silica being present. Our invention is applicable to a variety of hydrocarbon conversion reactions, particularly those in which the hydrogen-carbon ratio is altered. Among the numerous reactions for which our process is applicable are dehydrogenation, hydrogenation, hydrogenolysis, cracking, hydrocracking (cracking under hydrogen pressure), isomerization, oxidation, aromatization, cyclization, hydrodesulfurization, alkylation, dealkylation, polymerization, and hydrogen exchange systems.

The process of the present invention is particularly adapted for reforming naphtha stocks. In reforming naphtha or gasoline stocks with the catalyst disclosed herein, the conditions may be varied rather widely; thus temperatures of about 600° to about 1050° F. are suitable and the preferred range is from about 850° to about 950° F. Within these temperature limits, weight space velocities of about 0.05 to about 10.0 pounds of naphtha per hour per pound of catalyst in the reaction zone may be employed advantageously; however, space velocities of about 0.25 to about 5.0 provide the best results. Hydrogen should be introduced into the reforming reactor at rates running from about 0.5 to about 30.0 mols of hydrogen per mol of hydrocarbon reactants. This hydrogen may be in admixture with light gaseous hydrocarbons. In fact, it is usually introduced by recycling the normally gaseous products, chiefly hydrogen along with about 10–50% by volume more or less of hydrocarbons containing 1–3 carbon atoms of the hydroforming reaction. One important function of hydrogen is to maintain the activity of the contact material by minimizing coke deposition thereon. While the total reaction pressure may be maintained at any value between about 50 and about 1000 pounds per square inch gauge (p.s.i.g.), the best results are obtained by holding the reaction pressure within the range between about 100 and about 750 p.s.i.g. The conditions can be varied to include operations wherein there is a net consumption of hydrogen, as well as a net production of hydrogen as in "hydroforming."

The process of this invention can involve a static or fluid bed of catalyst, and can also involve a fixed bed or a circulating bed. In any case, the catalyst can be in lump, granular or finely divided form. Granular catalyst may have a particle size of about 0.1 to 10 mm. average diameter; whereas the powdered or finely divided catalyst may have a particle size of about 5 to about 250 microns, or more usually about 10 to 100 microns. In a moving bed system, generally, a catalyst to oil ratio, on a weight basis, of about 0.05 to about 20 or, more usually, about 0.1 to about 10, preferably about 0.5 to 2.5 is employed.

Quite unexpectedly, it was observed that eta-alumina is an unusually excellent material for catalysts. It was found that eta-alumina is superior to the well-known gamma-alumina insofar as catalytic property is concerned. This was observed by a comparison between gamma- and eta-alumina, when each type of alumina was activated with a catalytic agent of this invention. Eta-alumina is not only superior to gamma-alumina in catalytic activity, but it also cooperates with the catalytic agent, viz., a metal of group VI of the periodic table, and/or a sulfide and/or an oxide thereof. The cooperation is manifested as an increase in catalytic activity and selectivity, particularly in the case of hydrocarbon conversion, e.g., reforming and naphtha fractions.

Eta-alumina does not occur in the natural state, but instead, it is a form of alumina which is prepared synthetically. Heretofore, other types of alumina, such as gamma-alumina, have been widely used in catalysts primarily as a carrier material. Eta-alumina represents a distinct and different form of alumina from gamma-alumina or any other known types of alumina. By X-ray anailysis the particular crystalline form is determined by the relative intensities and the "$d$" spacings of the reflections or lines appearing in the X-ray diffraction pattern. For the purpose of comparision, the relative intensity of the various "$d$" spacings or lines, expressed in angstrom units A, for gamma- and eta-aluminas are given below.

| Gamma-Alumina | | Eta-Alumina | |
|---|---|---|---|
| "$d$" | Relative Intensity | "$d$" | Relative Intensity |
| 2.8 | VW. | 4.6 | W. |
| 2.42 | MW. | 2.8 | VW. |
| 2.30 | M (sharp). | 2.4 | M. |
| 2.20 | VVW. | 2.3 | W. |
| 2.10 | VVW. | 1.98 | SM. |
| 2.00 | SM.[1] | | |
| 1.97 | M.[1] | | |
| 1.53 | VW. | 1.53 | VW. |
| 1.40 | S. | 1.40 | S. |
| 1.15 | VW. | 1.21 | VVW. |
| 1.04 | VVW. | 1.14 | VW. |
| 0.99 | VVW. | 1.03 | VVW. |
| | | 0.99 | VVW. |

[1] These lines are usually observed together as a single relatively broad line at 1.98.

The symbols used for designating relative intensity are "S" for strong, "M" for medium, "SM" for strong to medium, "W" for weak, "VW" for very weak and "VVW" for very, very weak. On the basis of the latest work done on eta-alumina, it appears that it belongs to the cubic spinel system and contains a unit cell parameter of 7.94 A.

The use of eta-alumina in combination with a metal of group VI of the periodic table and/or a sulfide and/or an oxide thereof, yields a catalyst which possesses exceptional qualities for the conversion of hydrocarbons. Generally, the eta-alumina comprises about 60 to about 99%, preferably about 75 to about 97% by weight, based on the total catalyst; whereas the metal of group VI of the periodic table and/or a sulfide and/or an oxide thereof comprising about 1 to about 40% by weight, based on the total catalyst. In the case of reforming hydrocarbon oils, it is preferred to employ an oxide of chromium and/or molybdenum for this purpose. In this respect, more usually, about 1 to about 30%, preferably about 3 to about 25% of the oxide of chromium and/or molybdenum, based on the total weight of the catalyst, is employed. Chromium oxide and molybdenum oxide possess unusual properties for reforming hydrocarbon oils. The use of eta-alumina in combination with these catalytic materials produces a catalyst which possesses advantages over catalysts containing any other type of alumina in combination with the oxides of chromium or molybdenum. Chromia ($Cr_2O_3$) and molybdena ($MoO_3$) are particularly effective catalytic agents in combination with eta-alumina, with or without silica.

It is also intended in this present invention to employ silica in combination with eta-alumina as the carrier material for the catalytic agent comprising the metal of group VI of the periodic table and/or the sulfides and/or oxides thereof. Silica possesses the property of imparting greater stability towards heat to the catalytic material. In this respect, it was noted that the presence of silica in an amount of at least about 0.1% by weight, based on the total catalyst, improved substantially the stability of eta-alumina towards heat at elevated temperatures. For this purpose, generally, silica in the amount of about 1 to about 10%, based on the total weight of the catalyst can be employed.

In order to more fully understand the present invention, reference will be had to specific examples thereof, however, it should be understood that no undue limitations or restrictions are to be imposed by reason thereof.

For the purpose of comparison, a catalyst containing gamma-alumina was evaluated under hydroforming conditions. A second catalyst containing eta-alumina was evaluated under comparable operating conditions. The details of catalyst preparations are given below.

CATALYST I

The alumina-silica sol was made by reacting the following materials: 1500 lbs. of aluminum shot, approximately 7500 lbs. of used aluminum shot remaining in the tank from previous reactions, 3500 gallons of water, 280 lbs. of silicon tetrachloride, 7 lbs. of HgO; 50–100 lbs. of Hg from previous reactions, and 1460 lbs. of 88% formic acid. The alumina-silica sol after centrifuging contained 13% solids and had a specific gravity of 1.150 at 100° F. Approximately 175 lbs. of concentrated ammonium hydroxide was added to produce a thickening (gelation) of the sol (5 pH). This material was dried on a steam heated double drum dryer. The dried powder had an ignition loss of 57% and was calcined in a gas fired rotary drier at 1150° F., discharge temperature. The calcined powder was impregnated with ammonium molybdate solution by spraying the alumina in a Simpson mixer (edge runner) using 150 lbs. per batch. The wet paste was placed on stainless clad-carbon steel trays and calcined for 6 hours at 1470° F. in a box type oil fired 8' x 10' hearth furnace. The product analyzed 9.27% $MoO_3$ and 2.90% $SiO_2$.

The powder was stored in fiber drums. A sample was removed and calcined 6 hours at 1470° F. in a laboratory furnace. After pelleting into 3/16" pills using 2% aluminum stearate as a lubricant the catalyst was recalcined 3.5 hours at 1200° F. to burn off the stearate. A test unit charge of 460 cc. weighed 475 grams. X-ray showed gamma-alumina. The finished catalyst contained 9% by weight of $MoO_3$.

CATALYST II

An alumina-silica sol was prepared in a 20 gallon barrel using a 1/4 H.P. agitator with a 3 inch ring propeller having a speed of 400 r.p.m., 8100 grams of aluminum pellets (99.5% purity), 16 liters of water, 1200 cc. of concentrated HCl acid (37% HCl), 50 grams of mercuric oxide and 70 cc. of silicon tetrachloride were charged to the barrel. The mixture was agitated and the reaction was allowed to proceed for 1.5 hours. A dark grey sol was produced and then this material was passed through cheesecloth and into a stainless steel bucket. The filtered sol weighed 13.523 kg. and had a volume of 11.8 liters. By direct ignition, it was found that the sol contained 15.0% by weight of solids. Chemical analysis of the sol showed 14.82% of $Al_2O_3$, 0.23% $SiO_2$ and 4.09% chloride ions. X-ray analysis of the sol resulted in an unidentified cubic pattern.

A second batch of alumina sol was prepared by employing the same quantities of chemicals which are described above. However, the agitation with the 1/4 H.P. agitator was done at 1700 r.p.m. and the reactor was allowed to proceed for 1.25 hours. The volume of sol measured 10.25 liters, and weighed 12.251 kg. at 52° C. The pH of the sol was 4.72 at 22° C. By direct ignition, the solids content of the sol was 16.2% by weight. Chemical analysis of the sol showed 16.32% $Al_2O_3$, 0.29% $SiO_2$ and 4.62% chloride ions.

Both of the above prepared solids were combined, mixed and found to weigh 25,483 grams. A one-half portion of the sol measuring 11 liters was treated with 11 liters of concentrated ammonium hydroxide. The sol gelled to almost a solid state and then gradually thinned. The pH of the mixture was 10.50 at 25° C. The gel was then stirred slowly overnight for a total of 16 hours. The aged alumina gel, weighing 10.76 kg. was placed on an alumina tray and dried at 240° F. for 21.5 hours in a Despatch forced circulation oven. The grayish white granules were ground to a powdered form and weighed 1600 grams. The powder was then calcined in a furnace for 3 hours at 1200° F. and the calcined product weighed 852 grams. Analysis of the calcined product showed 96.98% $Al_2O_3$ and 0.40% chloride ions. By X-ray analysis the alumina was found to be the eta type.

The calcined powder of eta-alumina was impregnated with ammonium molybdate solution. The ammonium molybdate solution was prepared by adding 114.70 grams of ammonium molybdate to 750 cc. of water. The ammonium molybdate solution was then combined with 850 grams of the powdered eta-alumina. An additional 150 cc. of water was added in order to insure the formation of a uniform paste. The impregnated eta-alumina was then dried at 240° F. for a period of 18 hours in a Despatch oven. After drying, the material was ground to a powdered form and weighed 993 grams. Thereafter, the powdered catalyst mass was pelleted into 3/16" pills, which were then calcined for 3 hours at 1200° F. The finished catalyst analyzed 1.93% $SiO_2$, 9.91% $MoO_3$ and 0.05% of chloride ions. By X-ray analysis, the alumina was found to be eta-alumina.

As previously mentioned, Catalyst I contained gamma-alumina. The relative effectiveness of these two types of aluminas as supporting material was determined by using the same in a laboratory hydroforming test unit. In these tests, a Mid-Continent naphtha having an initial boiling point of 230° F. and an end point of 430° F. was used. This naphtha had an octane number (CFRR) of 29 and contained approximately 9% aromatics by volume. The reactor of the test unit had a 550 cc. capacity. The catalyst in suitable quantities were charged to the reactor. Hydrogen was fed in a pure state at the rate indicated (s.c.f.b.) measured as standard cubic feet per barrel of oil feed. The volume of gas, being measured at 60° F. and 760 mm. mercury. The regeneration of the catalyst was conducted by purging the same with hydrogen after it had become partially deactivated by the accumulation of carbonaceous deposits. The pressure of the system was released and then purged with nitrogen. The catalyst was then heated to about 950° F. and air was introduced along with the nitrogen. The concentration of air was regulated to produce a maximum temperature of 1050° F. in the catalyst bed. During this operation, the temperature at various points in the bed was ascertained with two thermocouples, one located in the upper part and the other in the lower part of the bed. The flow of nitrogen and air through the bed was continued for about ½ hour, after the temperature dropped to about 950° F. Following another nitrogen purge, the system was again placed under hydrogen pressure for about 1 hour, while the hydrogen rate and temperature were being adjusted before feeding the naphtha again.

Employing the procedure in the laboratory test unit described above, Catalysts I and II were evaluated. The results of these tests are given in Table I below.

*Table I*

| Run No. | 1 | 2 | 3 | 4 |
|---|---|---|---|---|
| Catalyst | II | II | I | I |
| Operating conditions: | | | | |
| Temperature, °F | 900 | 900 | 898 | 899 |
| Pressure, p.s.i.g | 250 | 250 | 250 | 250 |
| Space vel., W$_o$/hr./W$_c$ | 1.01 | 0.53 | 0.97 | 0.54 |
| Hydrogen, s.c.f.b | 5,024 | 4,799 | 4,941 | 4,238 |
| Catalyst charge, gms | 473 | 473 | 475 | 475 |
| Naphtha, gm./hr | 477 | 250 | 462 | 256 |
| Period of run, hrs | 8 | 8 | 8 | 8 |
| Yields (output basis): | | | | |
| Carbon, weight percent | 0.117 | | | .171 |
| Hydrogen, s.c.f.b | 490 | 461 | 520 | 633 |
| Dry gas, s.c.f.b | 915 | 1,027 | 750 | 943 |
| Total butanes, vol. percent | 8.0 | 10.8 | 4.4 | 4.9 |
| 100% C$_4$ gasoline,¹ vol. percent | 83.1 | 79.9 | 88.4 | 85.0 |
| 10# RVP gasoline, vol. percent | 83.5 | 76.6 | 94.4 | 89.8 |
| Polymers, vol. percent | 3.8 | 3.6 | 3.3 | 3.5 |
| Octane number CFRR clear: | | | | |
| 100% C$_4$ gasoline | 89.0 | 95.6 | 74.5 | 83.7 |
| 10# RVP gasoline | 89.0 | 95.4 | 76.1 | 84.6 |
| Space velocity, W$_o$/hr./W$_c$, to give 85 (CFRR) octane number C$_4$ free gasoline | 1.17 | 1.17 | 0.47 | 0.47 |
| 100% C$_4$ gasoline, vol. percent, 85 CFRR (O.N.) | 85.7 | 85.7 | 84.7 | 84.7 |

¹ Gasoline of 400° F. (E.P.).

From the data in Table I above, the most notable difference between the catalyst containing eta-alumina and gamma-alumina is the activity, expressed as the space velocity required to produce a C$_4$ free gasoline of 85 octane (CFRR). The yield of the 100% C$_4$ gasoline of 85 octane (CFRR) is greater in the case of eta-alumina than gamma-alumina. Thus, eta-alumina is substantially more active than gamma-alumina, with respect to the hydroforming operation.

Having thus provided a description of this invention, it should be understod that the scope thereof is to be measured by the following claims.

We claim:

1. A reforming process which comprises subjecting a hydrocarbon oil under suitable reforming conditions to contact with a catalyst comprising a catalytic agent selected from the group consisting of a metal of group VI of the periodic table and a sulfide and oxide thereof supported on eta-alumina, which eta-alumina comprises about 60 to about 99% by weight of the total catalyst.

2. A reforming process which comprises subjecting a hydrocarbon oil under suitable reforming conditions to contact with a catalyst comprising a catalytic agent selected from the group consisting of a metal of group VI of the periodic table and a sulfide and oxide thereof supported on a carrier material comprised of eta-alumina and silica.

3. A process for reforming a petroleum fraction which comprises subjecting the petroleum fraction under reforming conditions to contact with a catalyst comprising a metal of group VI of the periodic table and a sulfide and oxide thereof supported on eta-alumina.

4. A process for reforming a hydrocarbon oil which comprises subjecting the hydrocarbon oil under suitable reforming conditions to contact with a catalyst comprising a catalytic agent selected from the group consisting of a metal of group VI of the periodic table and a sulfide and oxide thereof supported on eta-alumina.

5. A process for reforming a naphtha fraction which comprises subjecting the naphtha fraction under suitable reforming conditions to contact with a catalyst comprising a catalytic agent selected from the group consisting of a metal of group VI of the periodic table and a sulfide and oxide thereof supported on eta-alumina.

6. A process for reforming a naphtha fraction which comprises subjecting the naphtha fraction to contact with a catalyst comprising an oxide of a metal of group VI of the periodic table on eta-alumina, in the presence of hydrogen, to a temperature of about 600° to about 1050° F., a pressure of about 50 to about 1000 p.s.i.g. and a weight space velocity of about 0.05 to about 10.

7. A process for reforming a naphtha fraction which comprises contacting the naphtha fraction with a fluidized mass of finely divided catalytic material comprising an oxide of a group VI metal of the periodic table on eta-alumina under suitable reforming conditions.

8. A process for reforming a petroleum naphtha which comprises contacting the petroleum naphtha with a catalyst comprising a sulfide of a metal of group VI of the periodic table on eta-alumina under suitable reforming conditions.

9. A process for reforming a petroleum naphtha which comprises contacting the petroleum naphtha with a catalyst comprising molybdenum oxide on eta-alumina, in the presence of hydrogen at the rate of about 0.5 to about 30 mols of hydrogen per mol of naphtha, a temperature of about 850° to about 950° F., a pressure in the order of about 100 to about 500 p.s.i.g., a weight space velocity of about 0.25 to about 5, and a catalyst to oil ratio of about 0.05 to about 20.

10. A process for reforming a petroleum naphtha which comprises contacting the petroleum naphtha with a catalyst comprising chromium oxide and eta-alumina under suitable reforming conditions.

11. A process for reforming petroleum naphtha which comprises contacting the naphtha with a catalyst comprising molybdenum oxide on eta-alumina, in the presence of hydrogen at a rate of about 0.5 to about 30 mols of hydrogen per mol of naphtha, at a temperature of about 850° to about 950° F., a pressure of about 100 to about 750 p.s.i.g., a weight space velocity of about 0.25 to about 5, a catalyst to oil ratio of about 0.1 to about 10 and selecting the conditions whereby a net production of hydrogen is effected in the operation.

12. A process for reforming naphtha which comprises contacting naphtha with a catalyst comprising molybdenum oxide on eta-alumina, which eta-alumina comprises about 60 to about 99% by weight of the total catalyst, in the presence of hydrogen at the rate of about 0.5 to about 30 mols of hydrogen per mol of naphtha, a temperature of about 600° F. to about 1050° F., a pressure of about 100 to about 750 pounds per square inch gage and a weight space velocity of between about 0.25 and about 10.0.

References Cited in the file of this patent

UNITED STATES PATENTS

Re. 22,196    Heard    Oct. 6, 1942

(Other references on following page)

UNITED STATES PATENTS

| | | |
|---|---|---|
| 2,274,633 | Pitzer et al. | Mar. 3, 1942 |
| 2,277,512 | De Simo et al. | Mar. 24, 1942 |
| 2,331,292 | Archibald et al. | Oct. 12, 1943 |
| 2,371,237 | Heard et al. | Mar. 3, 1945 |
| 2,422,172 | Smith et al. | June 10, 1947 |
| 2,636,865 | Kimberlin | Apr. 28, 1953 |
| 2,662,861 | Riblett et al. | Dec. 15, 1953 |
| 2,677,649 | Kirschenbaum et al. | May 4, 1954 |
| 2,734,022 | Kimberlin et al. | Feb. 7, 1956 |
| 2,796,326 | Kimberlin et al. | June 18, 1957 |

OTHER REFERENCES

Stumpf et al.: Thermal Transformations of Aluminas and Alumina Hydrates, Ind. and Eng. Chem., vol. 42, pp. 1398–1403 (1950).